United States Patent [19]

Petrone

[11] Patent Number: 5,778,919

[45] Date of Patent: Jul. 14, 1998

[54] PIPELINE FLOW STOPPER WITH DUAL SHAFTS

[75] Inventor: Joseph Petrone, Ringwood, N.J.

[73] Assignee: Custom Service Laboratories of N.J., Inc., North Bergen, N.J.

[21] Appl. No.: 794,496

[22] Filed: Feb. 4, 1997

Related U.S. Application Data

[63] Continuation-in-part of Ser. No. 497,928, Jul. 5, 1995, which is a continuation-in-part of Ser. No. 380,210, Jan. 30, 1995, Pat. No. 5,503,188, and a continuation-in-part of Ser. No. 294,372, Aug. 23, 1994, Pat. No. 5,439,032, which is a continuation of Ser. No. 176,043, Dec. 30, 1993, abandoned.

[51] Int. Cl.$^6$ ............................ F16L 55/128; F16K 43/00
[52] U.S. Cl. .................... 137/15; 137/317; 137/318; 138/93; 138/97
[58] Field of Search .............. 137/15, 317, 318; 138/93, 94, 97, 91

[56] References Cited

U.S. PATENT DOCUMENTS

| | | | |
|---|---|---|---|
| 539,568 | 5/1895 | Bride | 138/93 |
| 628,726 | 7/1899 | Schultz | 138/93 |
| 740,795 | 10/1903 | Behringer | 138/93 |
| 1,590,186 | 6/1926 | Fanselow | 137/318 |
| 1,760,750 | 5/1930 | Goodman | 138/93 |
| 1,946,138 | 2/1934 | Gardner | 138/93 |
| 2,171,942 | 9/1939 | Mueller | 137/318 |
| 2,889,982 | 6/1959 | Schaub et al. | 138/93 |
| 2,976,191 | 3/1961 | Weston | 138/93 |
| 3,019,819 | 2/1962 | Ankario | 138/93 |
| 3,805,844 | 4/1974 | Bacon | 138/93 |
| 3,842,864 | 10/1974 | Riegel et al. | 138/93 |
| 3,854,694 | 12/1974 | Coons | 138/93 |
| 3,973,584 | 8/1976 | McKinnon et al. | 137/318 |
| 4,013,097 | 3/1977 | Calandra | 138/93 |
| 4,079,755 | 3/1978 | Van der Lans | 138/93 |
| 4,155,373 | 5/1979 | DiGiovanni | 137/15 |
| 4,351,349 | 9/1982 | Minotti | 137/318 |
| 4,428,204 | 1/1984 | Brister | 138/93 |
| 4,509,343 | 4/1985 | Brister | 137/317 |
| 4,890,483 | 1/1990 | Vetter | 73/40.5 |
| 5,285,806 | 2/1994 | Ortega | 137/318 |

FOREIGN PATENT DOCUMENTS

| | | | |
|---|---|---|---|
| 0158419 | 1/1983 | Germany | 138/93 |
| 20301 | 5/1907 | United Kingdom | 138/93 |
| 188695 | 11/1922 | United Kingdom | 138/93 |
| 1245254 | 9/1971 | United Kingdom | 138/93 |
| 2140894 | 5/1984 | United Kingdom | 138/93 |

*Primary Examiner*—George L. Walton
*Attorney, Agent, or Firm*—Friscia & Nussbaum

[57] ABSTRACT

These objects and advantages are achieved by the inflatable gas pipeline stopper of the present invention, which is used to stop gas flowing through a pipeline when effecting repairs of the pipeline. The invention includes an attachment for attachment to a gas pipeline. A quick connect is provided to form an airtight seal between the stopper and the attachment. A junction box is attached at the other end of the quick connect. The junction box has two receptacles on the upper end thereof for receiving two shafts therein. Each shaft has a port and a valve. At the top of each shaft is a quick connect for attachment of a stuffing box thereto for insertion of air lines therethrough. Within the two shafts, and attached to the air lines, extend two moveable bag inserting and retracting plunger assemblies attached to an air source at the tops thereof. After the device is attached to a Mueller machine or other similar type machine, or a tee, the moveable bag inserting and retracting plunger assemblies are pushed through the shafts and the junction box to extend into the gas pipeline. Air is then supplied to the moveable bag inserting and retracting plunger assemblies to inflate the air bags to stop the flow of gas through the gas pipeline. One bag may be deflated to allow gas to flow into the pipeline flow stopper and up one of the shafts to a port to which another pipe may be attached to re-route the flow of gas about a break on a pipline.

16 Claims, 6 Drawing Sheets

PIPELINE FLOW STOPPER WITH DUAL SHAFTS

RELATED APPLICATIONS

This application is a continuation-in-part application of U.S. patent application Ser. No. 08/497,928 filed Jul. 5, 1995, by Petrone, now pending, which is: 1) a continuation-in-part application of U.S. patent application Ser. No. 08/380,210 filed Jan. 30, 1995, by Petrone, now U.S. Pat. No. 5,503,188, dated Apr. 2, 1996, which is a continuation application of U.S. patent application Ser. No. 08/176,043, filed Dec. 30, 1993, by Petrone, abandoned; and 2) a continuation-in-part application of U.S. patent application Ser. No. 08/294,372 filed Aug. 23, 1994, by Petrone now U.S. Pat. No. 5,439,032, dated Aug. 8, 1995. The disclosures of these related applications are expressly incorporated herein by reference.

BACKGROUND OF THE INVENTION

1. Field of the Invention

The present invention relates to a method and apparatus for stopping gas flow through a broken gas pipeline to permit repairs to be made on the gas pipeline, and more specifically to gas pipeline stopper having individual dual shafts and dual inflatable air bags for stopping gas flow through a gas pipeline. Either one or both air bags can be removed through either individual dual shaft by means of quick disconnect attachments at the upper ends thereof while the inserting apparatus in still attached to the gas pipeline without any gas escaping into the atmosphere in the event that an air bag ruptures or develops a leak while it is inflated in the gas main, in addition to a removable assembly for by-passing, purging, gas up, line pressure monitoring and venting.

2. Related Art

There have been many attempts in the past to provide an effective inflatable air bag type gas pipeline stopper to permit repairs to be made to broken gas pipelines. Currently, the standard procedure for stopping gas flow through a pipeline requires tapping a hole in the gas pipeline to permit an inflatable stopper to be inserted into the pipeline. One of the devices used to cut a hole in the gas main is commonly known as a Mueller Co. Drilling and Tapping machine. The Mueller machine, as well as most other drilling and tapping machines made by other manufacturers, is generally cylindrical and extends up from its base. Upper ears are provided on the Mueller machine for supporting bolts that interconnect with a chain which extends around the pipe to secure the Mueller machine to the gas pipeline. The Mueller machine provides an airtight assembly with the gas pipe and accepts a drilling tool for drilling a hole through the pipe and a tapping tool for cutting internal threads therein. Thereafter, the Mueller machine is removed and an inflatable air bag type gas pipeline stopper may be inserted into the hole. When the Mueller machine is removed from the gas pipeline and during the insertion of the inflatable air bag type stopper, gas is continuously escaping from the tap hole.

In order to prevent gas from continuously escaping from the hole, it is necessary to weld an expensive flange onto a steel main prior to attaching the Mueller machine to it and then to use a mechanical device inserted through the Mueller machine to stop the flow of gas in the pipeline. This procedure, designed for high pressure gas mains, is costly and time consuming when used on low pressure gas mains, however, there is no alternative low cost method currently available.

With plastic gas pipelines, a "Drisco Plastic Tapping Tee," or other tapping tee sold by other manufacturers, is fused to the gas pipeline and then a hole is cut into the pipeline through the tapping tee. Thereafter, an air bag type stopper may be inserted into the gas pipeline to stop gas from flowing through the gas pipeline. Gas can escape the hole which not only wastes money associated with the lost gas, but it is also hazardous in that gas leaks into an area where work is being conducted.

It is a common safety practice when stopping off low pressure gas mains to use two inflatable type pipeline stoppers in series, one facing upstream and the other facing downstream, with a pipe positioned therebetween for venting into the atmosphere any gas that escapes past the upstream bag so that such gas will not seep into the section of pipe being worked on in the downstream area since this would cause a serious hazard due to the fact that welding is typically required to repair or replace the gas main. Since many of the older cast iron and steel gas mains have irregular and rusty interiors it is often difficult to get a gas tight seal. Therefore, two bags are always used with a vent between them. Furthermore, in the event that one inflatable pipeline stopper should rupture, there is always a backup. It should be noted that this double bagging system is applied to all low pressure steel, cast iron and even plastic gas mains.

Importantly, the inflatable air bag type pipeline stoppers in the prior art comprise a single air bag. Therefore, to effectively stop gas flow through a low pressure gas pipeline, two separate gas pipeline stoppers must be used on each side of the break in the gas pipeline, for a total of four separate gas pipeline stoppers. Further, a vent must be positioned between each pair of stoppers to vent gas buildup therebetween. Accordingly, a total of three holes must be drilled into the low pressure gas pipeline in each side of the broken the gas pipeline. This typically requires drilling and tapping a number of holes and digging a rather long trench through the ground to reach the various areas of the gas pipeline. This procedure is very time consuming and costly.

Additionally, it is sometimes desirable to re-route the flow of gas out of a pipeline before a break, and then back into the pipeline after the break, to effectively bypass the broken pipeline. However, this cannot be easily accomplished with conventional pipeline flow stoppers without the need for attaching additional equipment directly to the pipeline itself.

None of the prior efforts have effectively reduced the need for more than one gas pipeline stopper on each side of a break in a low pressure gas pipeline, or the requirement that a plurality of holes must be drilled in the gas pipeline to stop the flow of gas therethrough, or provided a means for effectively re-routing the flow of gas around a broken gas pipeline. Furthermore, none of the prior efforts provided for the capability of being able to remove one or both air bags through either an individual dual shaft by means of quick disconnect attachments at the upper ends thereof while the inserting apparatus is still attached to the gas pipeline without any gas escaping into the atmosphere in the event that an air bag ruptures or develops a leak while it is inflated in the gas main, nor do they provide a removable assembly for by-passing, purging, gas up, line pressure monitoring and venting. These prior attempts include:

Gardner U.S. Pat. No. 1,946,138, which discloses a pneumatic stopper for a gas pipe including an air bag for stopping the pipe. The device includes a tubular housing and an inflatable bag, interconnected with an air tube which extends within the tubular housing. The air tube and bag may be moved downward with respect to the tubular housing to extend into the pipe after the housing has been threadably attached to the pipe. The air bag may then be inflated to stop the pipe.

Ankarlo, U.S. Pat. No. 3,019,819, discloses a flow stopping apparatus for a gas pipe comprising a device that is inserted into a small lateral opening formed in the pipe. The device includes a frame structure which, in a collapsed condition, is elongated and relatively narrow and which is constructed such that the peripheral portions thereof may be forced into a substantially circular shape after insertion of the stopping device into the pipe. An inflatable tube is inserted into the expansible frame for expanding the stopping device within the gas pipe.

Bacon U.S. Pat. No. 3,805,844, discloses a plugging device for a pipeline having a tapping means, an expandable bag that may be expanded with water, and means to create a freezing temperature to freeze water and expand the bag to plug the pipe.

Riegel, et al., U.S. Pat. No. 3,842,864, discloses a line stopper comprising a housing that can be mounted to a conventional pipe tapping machine and a bag insertion assembly mounted in the housing. The insertion assembly includes a slidable insertion tube and an inflatable bag connected at the lower end thereof. The bag has a rigid neck connected by a knuckle means to the insertion tube to enable the bag to be pivoted into the pipe. The housing is secured to the valve assembly by two pairs of ears which extend outward from the base and which are clamped to the valve assembly by bolts. When the bag is placed into the pipe the insertion tube covers the edge of the hole in the pipe to prevent abrasion between the bag and the edge of the hole in the pipe.

McKinnon et al., U.S. Pat. No. 3,973,584, discloses a piercing valve for tapping pipelines for adjusting pressurized gas. The device includes upper and lower blocks with registering grooves assembled about a pipeline. A piercing needle is then moved upward to provide communication through the pierced hole into an upper transfer passageway in the upper block.

Calandra, U.S. Pat. No. 4,013,097, discloses an apparatus for damning the flow of fluid in a pipeline comprising an inflatable bladder wherein an outer bag of the bladder and an inner bag of the bladder are separated by fluid. The device is placed within a pipe and the bladder is inflated, thereby forcing the outer bag, through the liquid, to seal the pipeline.

Van der Lans, U.S. Pat. No. 4,079,755, discloses an inflatable pipe plug having a series of reinforcing strips of rubber sandwiched between inner and outer molded rubber members. The device includes a metal head. A metal cap, having an air inlet therein, is attached to the metal head to complete the assembly.

DiGiovanni, U.S. Pat. No. 4,155,373, discloses a method for shutting off gas in plastic pipes including a balloon-type stopper which may be inserted into the pipe and inflated to block the flow of gas. A ringlike compression seal is provided to prevent the escape of gas around the cutting tool during the cutting operation and to prevent gas leakage when the stopper is inflated within the pipe. The device includes a cylinder having an inflatable balloon therein which may be slid down and into the pipe and inflated by pump means.

Ortega, U.S. Pat. No. 5,285,806 (1994) discloses a method and apparatus for sealing off flow in a pipeline having an inflation bag to close off the pipeline and a restraining rod to prevent the inflatable bag from slipping within the line due to the force of the contents under pressure. A flexible sleeve is provided to assist the invention's installation through a pre-existing entry port.

Baumbach, U.S. Pat. No. 5,065,780 (1991) discloses a method and apparatus for connecting a branch conduit to an existing conduit through a housing containing a ball valve. The housing is formed as a conduit connection that encases the conduit when clamped. The forming of the hole in the conduit is performed by means of forces applied to a piston that is slidably situated in a special cutting tool.

Jiles, U.S. Pat. No. 5,052,431 (1991) discloses a method for cutting open the side of a pipe carrying gas under pressure to provide a bypass through the cut so that more suitable repairs can be subsequently effected. The pipe itself is equipped with a fixture. The tools enter the fixture's bore though a tool inlet into which the sealing plug of the insertion is screwed for a pressure tight fit. A secondary valve permits depressurization during insertion and removal of the tool-insertion assembly.

Willemsen U.S. Pat. No. 4,431,017 (1984) discloses a method and apparatus for tapping a main pipe so that a tubular enclosure forming a branch pipe may be attached thereto. A drill, located within the interior of the tubular enclosure, penetrates the side of the main pipe. After drilling, the drilling means are removed and replaced by an extension of the tubular enclosure.

Minotti, U.S. Pat. No. 4,351,349 (1982) discloses a pipe repair method and apparatus having a conduit axially extending through a releasable gripping means which terminates about the pipe's exterior to form a seal. The conduit and the releasable gripping means isolate the pipe segment needing repair by providing an alternate pathway for bypassing the blockage.

Ledonne et al., U.S. Pat. No. 4,127,141 (1978) discloses a method and apparatus for sealing the side of a fluid carrying pipe during replacement of a service tee comprising a gate valve, an elongated plug wrench that passes through the plug valve and a stopper rod having an axial passage and terminating in a resilient member. The resilient member expands to radially plug the pipe upon being rotated with respect to the stopper rod.

Sands U.S. Pat. No. 3,995,655 (1976) discloses a method and apparatus for making a service line connection through a fitting to a main pipe. The apparatus comprises a fitting, a cutter member for forming a preliminary hole in the main pipe and a tapping tool for progressively enlarging the hole to the desired size.

Goodman, U.S. Pat. No. 1,760,750 (1930) discloses an inflatable stopper for gas and water mains that forms a complete closure for the main. Also, should the stopper buckle or otherwise become deformed upon insertion into the main, the placement of the closure will not be prevented.

None of these prior efforts provide the advantages or benefits of the present invention, e.g. reducing the number of holes that must be drilled into a pipe to stop gas flow therethrough. Additionally, none of these prior efforts teach or suggest using dual air bags extending from one gas pipeline stopper with both air bags being inserted through the same hole cut into a gas main to provide a seal to stop the flow of gas through a gas pipeline. Nor do any of these references teach a means of venting gas escaping past the upstream air bag through the same hole. Furthermore, prior art efforts do not teach or suggest the use of dual air bag type pipeline stoppers capable of being inserted or used through conventional gas tight drilling and tapping machines thereby preventing gas from continuously escaping during these procedures. Finally, none of these previous efforts teach or suggest an apparatus for use with plastic gas pipelines for preventing gas from escaping during the procedure of cutting the gas pipeline to insert an air bag type stopper or during the procedure of inserting the stopper into the plastic gas pipeline. Still even further, none of these previous efforts teach or suggest a gas pipeline flow stopper having dual shafts and dual air bags requires only one hole in a gas pipeline to stop gas flow therethrough. Additionally, none of these previous efforts teach or suggest an apparatus that is capable of being able to remove one or both air bags through either individual dual shaft by means of quick disconnect attachments at the upper ends thereof while the inserting apparatus is still attached to the gas pipeline without any gas escaping into the atmosphere in the event that an air bag ruptures or develops a leak while it is inflated in the gas main, nor do they provide a removable assembly for by-passing, purging, gas up, line pressure monitoring and venting.

OBJECTS AND SUMMARY OF THE INVENTION

It is a primary object of the present invention to provide a gas pipeline flow stopper apparatus which requires only one hole in the gas pipeline and which has dual air bags for stopping the flow of gas through the pipeline and which has individual dual shafts for retraction of the air bags.

It is another object of the invention to provide a gas pipeline front stopper with individual dual shafts and dual air bags in which either one or both air bags can be removed through either individual dual shaft by means of quick disconnect attachments at the upper ends thereof while the inserting apparatus is still attached to the gas pipeline without any gas escaping into the atmosphere in the event that an air bag ruptures or develops a leak while it is inflated in the gas main, in addition to a removable assembly for by-passing, purging, gas up, line pressure monitoring and venting.

It is another object of the invention to provide a gas pipeline flow stopper apparatus having individual dual shafts for allowing re-routing of gas flow through one shaft while blocking gas flow with an inflatable stopper extending through the other shaft.

It is another object of the present invention to provide a gas pipeline flow stopper having individual dual shafts with quick connect attachments at upper ends thereof for quickly and easily connecting or disconnecting the inflatable air bag attached to the inserting plunger running through the quick connect attachments in the event that one of the air bags rupture or develops a leak.

It is another object of the invention to provide a gas pipeline flow stopper having a quick connect attachments at a lower end thereof for quickly and easily connecting or disconnecting the stopper to a pipe.

It is an additional object of the present invention to provide a gas pipeline stopper that reduces the amount of holes that are needed to be drilled into a gas pipeline to stop the flow of gas through the gas pipeline.

It is an object of the present invention to provide a gas pipeline stopper which may be used to stop the flow of gas in a steel, cast iron or a plastic gas pipeline.

It is another object of the invention to provide a gas pipeline stopper having two air bags extending from the device that is capable of being inserted into the gas pipeline through only one hole cut into the gas pipeline.

It is even another object of the invention to provide a gas pipeline stopper having dual directional air bags which extend from the gas pipeline stopper in opposite directions into the gas pipeline.

It is a further object of the present invention to provide a gas pipeline stopper having dual air bags and a means for venting gas from the space between the dual air bags through the same tap hole through which said air bags are inserted into a gas main.

It is still an additional object of the invention to provide a gas pipeline flow stopper having dual air bags and a removable assembly for by-passing, purging, gas up, line pressure monitoring and venting.

It is still a further object of the present invention to provide an inflatable air bag type gas pipeline stopper that may be used with a conventional Mueller machine without the necessity of welding a costly flange onto a steel gas main.

It is an additional object of the present invention to provide an apparatus for preventing gas from escaping from a plastic gas pipeline during the procedure of cutting a hole in the plastic gas pipeline for receiving stopper.

It is even an additional object of the present invention to provide an apparatus for preventing gas from escaping from a plastic gas pipeline during the procedure of inserting a stopper in the gas pipeline.

It is even another object of the present invention to provide an apparatus for preventing gas from escaping from a plastic gas pipeline during the procedure of removing a stopper from the gas pipeline.

It is still another object of the present invention to provide an apparatus for use in connection with a tapping tee on a plastic gas pipeline for preventing gas from escaping from the pipeline before and after stopping the pipeline.

It is another object of the present invention to provide a gas pipeline stopper that can effect a gas tight seal between the gas pipeline stopper and the pipeline.

It is even a further object of the present invention to provide a gas pipeline stopper with dual inflatable air bags which air bags may be rapidly deflated.

It is yet a further object of the present invention to provide a gas pipeline stopper with dual inflatable air bags wherein the pressure within the air bags may be monitored.

It is even another object of the present invention to provide a gas pipeline stopper having dual air bags and a venting means for venting gas between the dual air bags, which venting means may be manually controlled from the exterior of the gas pipeline stopper from either of dual shafts.

It is yet another object of the present invention to provide a gas pipeline stopper with dual directional air bags wherein the direction that the air bags extend in the gas pipeline can be controlled and indicated from the exterior of the gas pipeline stopper.

It is yet another object of the present invention to provide a gas pipeline stopper having dual air bags wherein the gas pipeline stopper has a protective collar for preventing the air bags from contacting the abrasive edges of a hole drilled in the gas pipeline.

It is yet another object of the present invention to provide a gas pipeline stopper having as means to close off each individual dual shaft on the apparatus to prevent gas from escaping into the atmosphere when either quick connect coupling is removed in order to extract or leaking air bag.

These objects and advantages are achieved by the inflatable gas pipeline stopper of the present invention, which is used to stop gas flowing through a pipeline when effecting repairs of the pipeline. The invention functions in connection with a standard Mueller machine or drilling and tapping machines sold by other manufacturers used to drill a hole in a gas pipeline, or with a plastic gas pipeline by means of a tee. The invention includes a cylindrical stopper housing that is inserted into a Mueller machine or other similar type machines. A stuffing box or other means is provided so that there is an air tight fit between the gas pipeline stopper and the gas pipeline.

The invention includes an attachment means for attachment to a gas pipeline. A quick connect means is provided to form an airtight seal between the stopper and the attachment means. A junction box is attached at the other end of the quick connect. The junction box has two receptacles on the upper end thereof for receiving two shafts therein. Each shaft has a port and a valve. At the top of each shaft is a quick connect for attachment of a stuffing box thereto for insertion of air lines therethrough.

Within the two shafts, and attached to the air lines, extend two moveable bag inserting and retracting plunger assemblies attached to an air source at the tops thereof. After the device is inserted into the Mueller machine or other similar type machine, or a tee and air tight apparatus, and fastened thereto, the moveable bag inserting and retracting plunger assemblies are pushed through the shafts and the junction box to extend into the gas pipeline. Air is then pumped through air pipes of the moveable bag inserting and retracting plunger assemblies to inflate the air bags to stop the flow of gas through the gas pipeline. Additionally, removable assemblies containing an air pressure gauge and a means of inflating and deflating are provided on top of the moveable bag inserting and retracting plunger assemblies for measuring the air pressure in the inflatable bags. One or both of the air bags can be raised above the valve in the shaft, which can be closed, and then an exterior hookup could be attached to the port to re-route gas flow around a broken portion of a pipe.

The inflatable gas pipeline stopper of the present invention may be used with various size gas mains and holes tapped into the gas pipeline by virtue of a series of removable adapters and protective collars at the base of the cylindrical stopper housing to extend into the various diameter holes tapped into a gas pipeline. The cylindrical stopper housing also contains a valve means for permitting the venting of any gas that gets past the upstream inflatable bag, the venting being accomplished through the same hole in the gas pipeline through which the dual inflatable air bags are inserted. Thus, gas can thus be vented into the atmosphere.

When the stop off is completed and the air bag must be retracted into the air bag inserting cylinder, it is extremely difficult to retract the air bag because it remains partially inflated. The inflatable gas pipeline stopper of this invention overcomes this by means of a venturi pump adaptor connection at the top of each moveable inserting and retracting plunger assembly.

Insertion and use of both inflatable air bags as well as venting are all accomplished through a single tap hole in the gas main rather than through a plurality of tap holes as is now common practice. Furthermore, this stopping off procedure may be accomplished while the gas main is under pressure without gas escaping from the tap hole since this present invention is capable of being adapted to any existing air-tight drilling and tapping machines currently in use.

In the event that either or both air bags ruptures or develops a leak while inflated in the pipeline, it may be removed and replaced by means of quick disconnect couplings located at the upper ends of each individual dual shaft while the inserting apparatus is still attached to the pipeline without any gas escaping into the atmosphere by simply opening the quick disconnect coupling, pulling the out the movable gas inserting and retracting plunger assemblies running therethrough and closing the valve located on each individual dual shaft.

This present invention also includes a removable assembly which is attached to one of the individual dual shafts for by-passing, purging, gas up, line pressure monitoring and venting.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Figure 1:
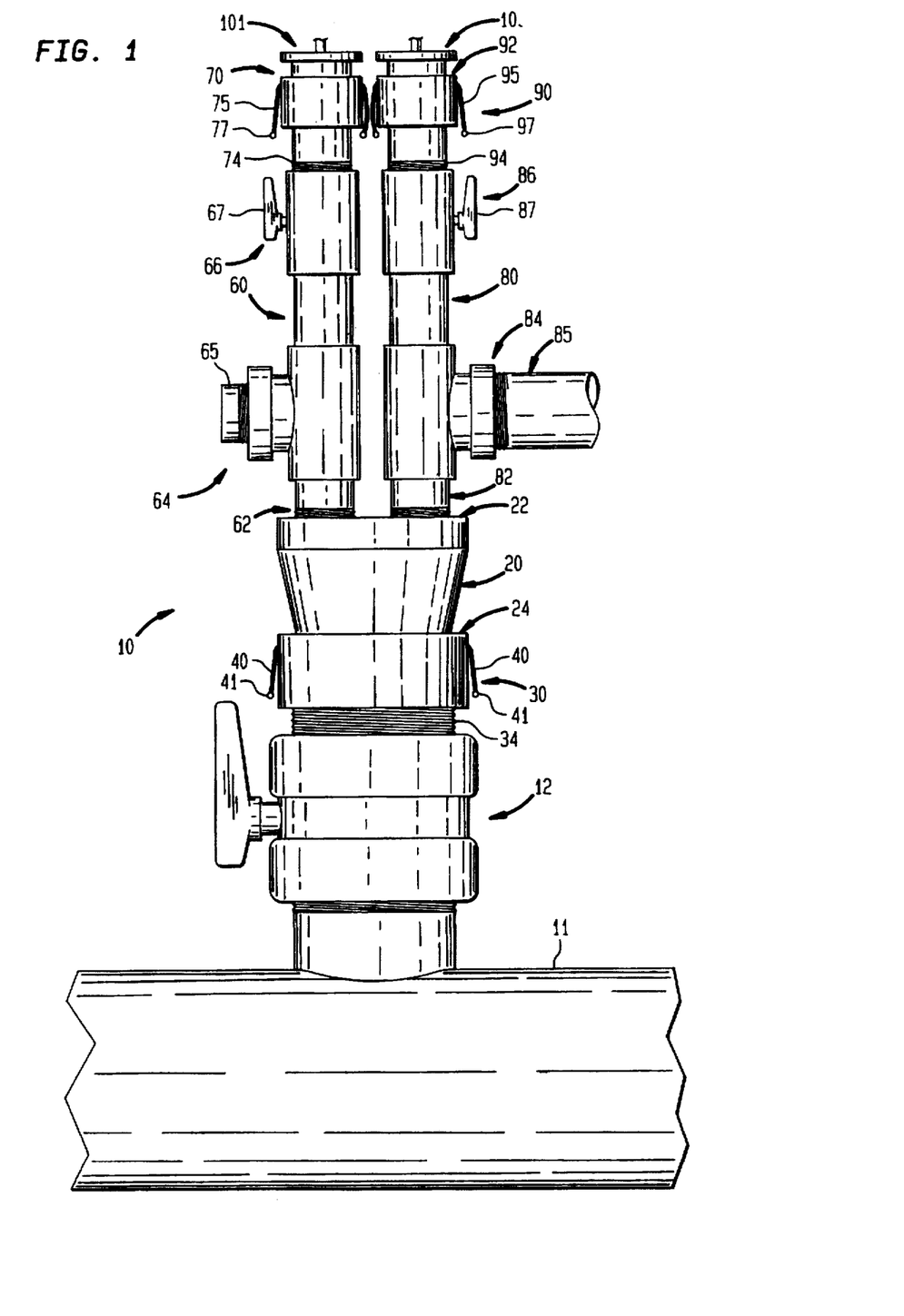
FIG. 1 is a side plan view of the gas pipeline stopper of the present invention.
Figure 2:
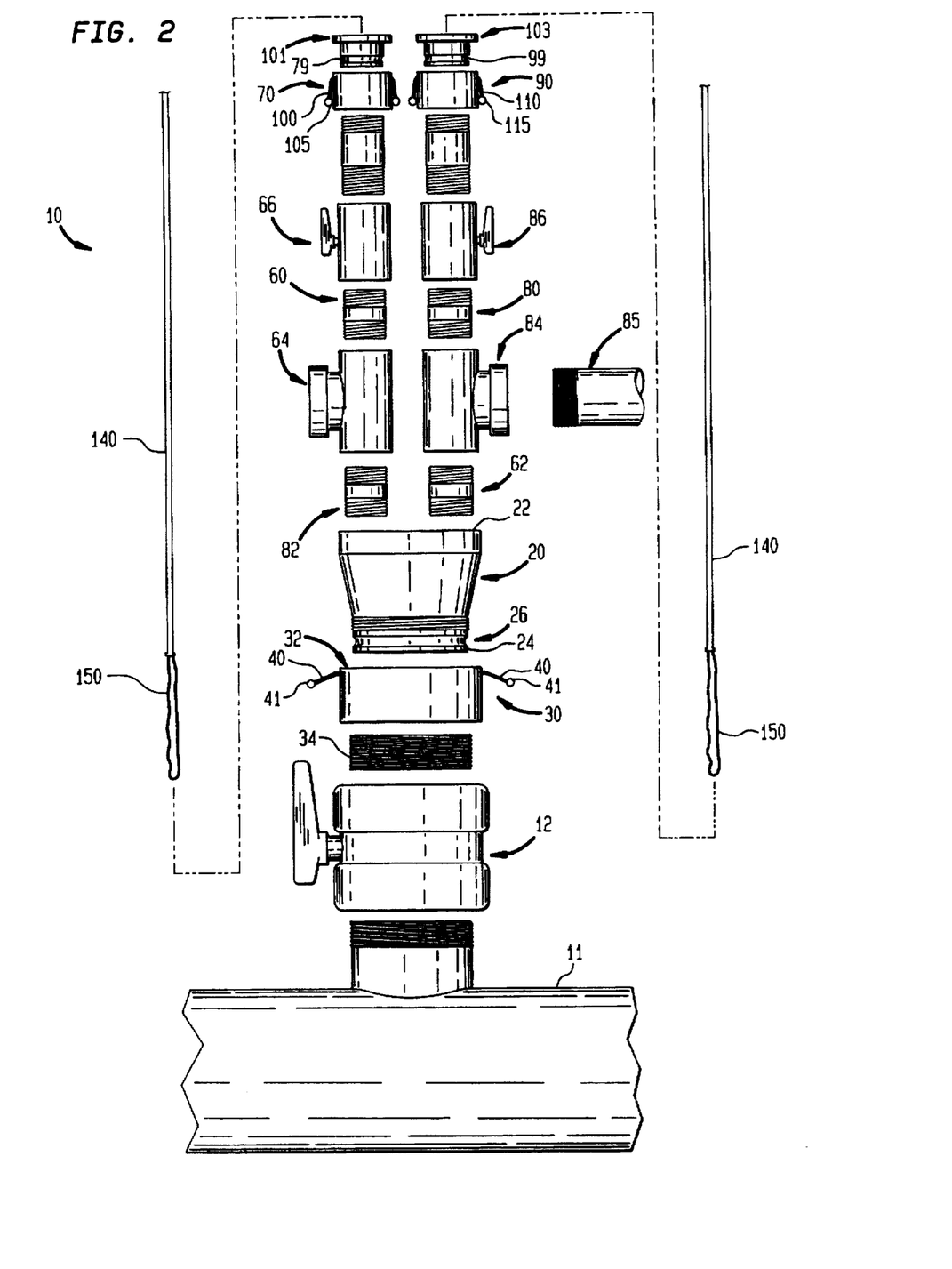
FIG. 2 is an exploded side plan view of the gas pipeline stopper of the present invention shown in FIG. 1.
Figure 3:
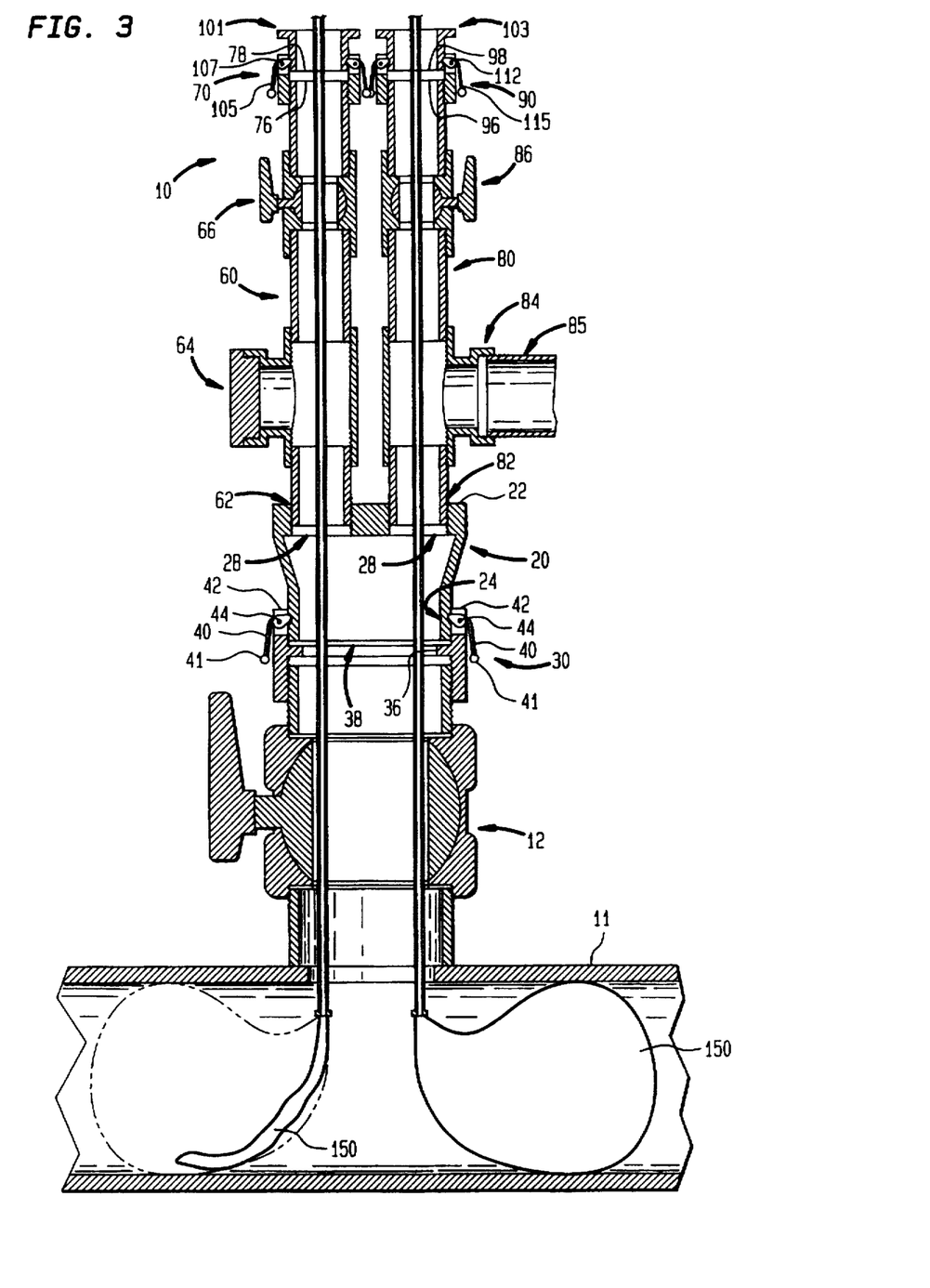
FIG. 3 is a cross section view of the gas pipeline stopper invention shown in FIG. 1 with the bags extended into a gas pipeline.
Figure 4:
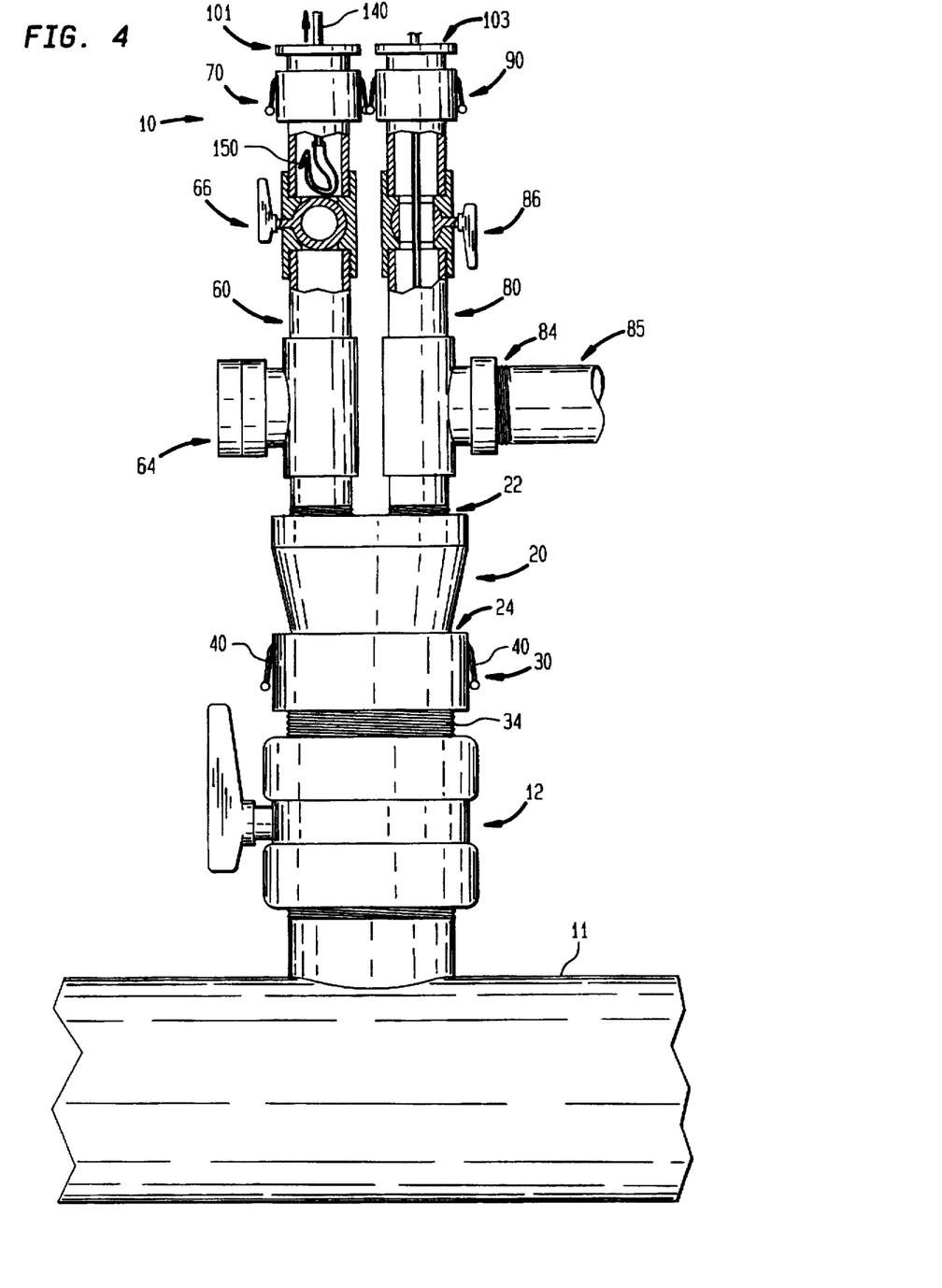
FIG. 4 is a partially cut away plan view of the gas pipeline stopper invention shown in FIG. 1 with one of the dual air bags retracted into one of the shafts.

The gas pipeline stopper of the present invention is indicated generally in FIGS. 1–4 by reference numeral 10. Referring to FIG. 1, the inflatable gas pipeline stopper 10 includes a junction box 20 having an upper end 22 and a lower end 24. The junction box 20 may be tapered, if desired, from the upper end 22 to the lower end 24.

The lower end 24 of the junction box 20 is configured to connect with a first quick connect 30. First quick connect 30 includes an upper receptacle 32 and a lower threaded portion 34. The upper receptacle 32 is configured to receive the lower end 24 of the junction box 20 in a fluid-tight engagement. This is accomplished by contact of the lower end 24 of the junction box 20 against a lip 36 within the quick connect 30, which lip 36 has a gasket 38 thereon for contact against the lower end 24 of the junction box 20 to form a fluid-tight seal between the junction box 20 and the first quick connect 30. The lower end 24 of the junction box 20 further includes a circumferential recess 26 which coacts with cams 42 extending into the interior of the quick connect 30. The cams 42 extend from arms 40 which extend from the exterior of the quick connect 30. The cam 42 and arm 40 mechanism is pivotable about pivot 44 from a first position wherein the arms 40 are in an upper position and the cams 42 are moved to a position of non-interference with the interior of the quick connect 30, to a second, lower, locked position wherein the cams 42 are positioned to extend into the interior of the quick connect 30, wherein the cams 42 coact with the circumferential recess 26 to draw the junction box 20 down against the gasket 38 to lock the junction box 20 to the quick connect 30 and maintain a fluid-tight seal therebetween. The arms 40 may additionally include rings 41 at the ends away from the cams 42 to facilitate manipulation of the arms 40.

The upper end 22 of the junction box 20 includes two apertures 28, which are preferably threaded, for receiving lower ends 62 and 82 of shafts 60 and 80 in threaded or other engagement therewith to attach the shafts 60 to the junction box 20. Importantly, the junction box 20 serves to receive two air bags inserted through separate shafts at an upper end 22, and passes the air bags out though a single aperture at a lower end 24.

Each of the shafts 60 and 80 further include ports 64 and 84 for attachment of auxiliary lines thereto. When not in use, ports 64 and 84 can be plugged with plug 65. When in use, ports 64 and 84 can be used to connect an auxiliary pipe 85 thereto to re-route gas flow, as will hereinafter be described. Additionally, each shaft 60 and 80 includes valve means 66 and 86 having handles 67 and 87 for stopping the flow of gas therethrough as will hereinafter be described. Still further, each shaft 60 and 80 includes a shaft quick connect 70 and 90 at an upper end. The shaft quick connects 70 and 90 are constructed like the first quick connect 30, and include upper receptacles 72 and 92, and lower threaded portions 74 and 94. The upper receptacles 72 and 92 are configured to receive aperture plugs 101 and 103 therein, in a fluid-tight engagement. This is accomplished by contact of the lower ends of the aperture plugs 101 and 103 against a lip 76 and 96 in each of the quick connects 70 and 90, which lips 76 and 96 have gaskets 78 and 98 thereon for contact against the lower end of the aperture plugs 101 and 103 to form a fluid-tight seal. Like the lower end of the junction box, the lower ends of the aperture plugs 101 and 103 include circumferential recesses 79 and 99, which coact with cam 102 and 112 extending into the interiors of quick connects 70 and 90. The cams 102 and 112 extend from arms 100 and 110 which extend from the exteriors of the quick connects 70 and 90. The cams 102 and 112, and arms 100 and 110, are pivotable about pivots from a first position wherein the arms 100 and 110 are in an upper position and the cams 102 and 112 are moved to a position of non-interference with the interiors of the quick connects 70 and 90, to second, lower, locked positions wherein the cams 102 and 112 are positioned to extend into the interiors of the quick connects 70 and 90, wherein the cams 102 and 112 coact with the circumferential recesses 79 and 99 to draw the aperture plugs 101 and 103 down against the gaskets 78 and 98 to lock the aperture plugs 101 and 103 to the quick connects 70 and 90 to form and maintain a fluid-tight seal therebetween. The arms 100 and 110 may additionally include rings 105 and 115 at the ends away from the cams 102 and 112 to facilitate manipulation of the arms 100 and 110.

The present invention further includes dual moveable air bag inserting and retracting plunger assemblies positioned in each shaft 60 and 80, having a number of components, including air lines 140 that extend into the shafts 60 and 80 through aperture plugs 101 and 103. Aperture plugs 101 and 103 coact with aperture stoppers and the air lines 140 to provide an airtight seal with the air lines 140. The air lines 140 may include removable assemblies for inflating and deflating the air bags and monitoring the pressure within the air bags. These assemblies may be located at upper ends of the air lines 140 and include air pressure gauges. Also, it may be desirable to provide adjustable directional bag indicators on the upper ends of the air lines 140. Attached to the air lines 140, at lower ends thereof are inflatable air bags 150. Means for inserting and retracting the air lines may also be provided.

In operation, a hole is tapped into a broken pipeline, prior to the brake, and a tee or a Mueller machine or other device known in the art is attached to the pipeline 11. A valve assembly 12 is attached thereto as is known in the art. The valve assembly is movable from an open position which allows communication of the stopper 10 with the interior of the pipe 11, to a closed position which provides an airtight seal at the location of the valve. The flow stopper comprising the shafts 60 and 80, the junction box 20 and the first quick connect 30 are attached to the valve 12 by threaded engagement or other means is known in the art. Aperture plugs 101 and 103 are attached to the upper ends of shafts 60 and 80 by means of quick connects 70 and 90. Air lines 140 are inserted though the aperture plugs 101 and 103 to extend air bags 150 within the shafts 60 and 80 of the pipeline flow stopper. After the pipeline flow stopper 10 is attached to the valve 12, the valve may be opened and the air lines 140 pushed down though the valve assembly 12 to extend the air bags 150 into the pipeline. Thereafter the airbags 150 may inflated to stop flow of gas though the pipeline.

Figure 5:
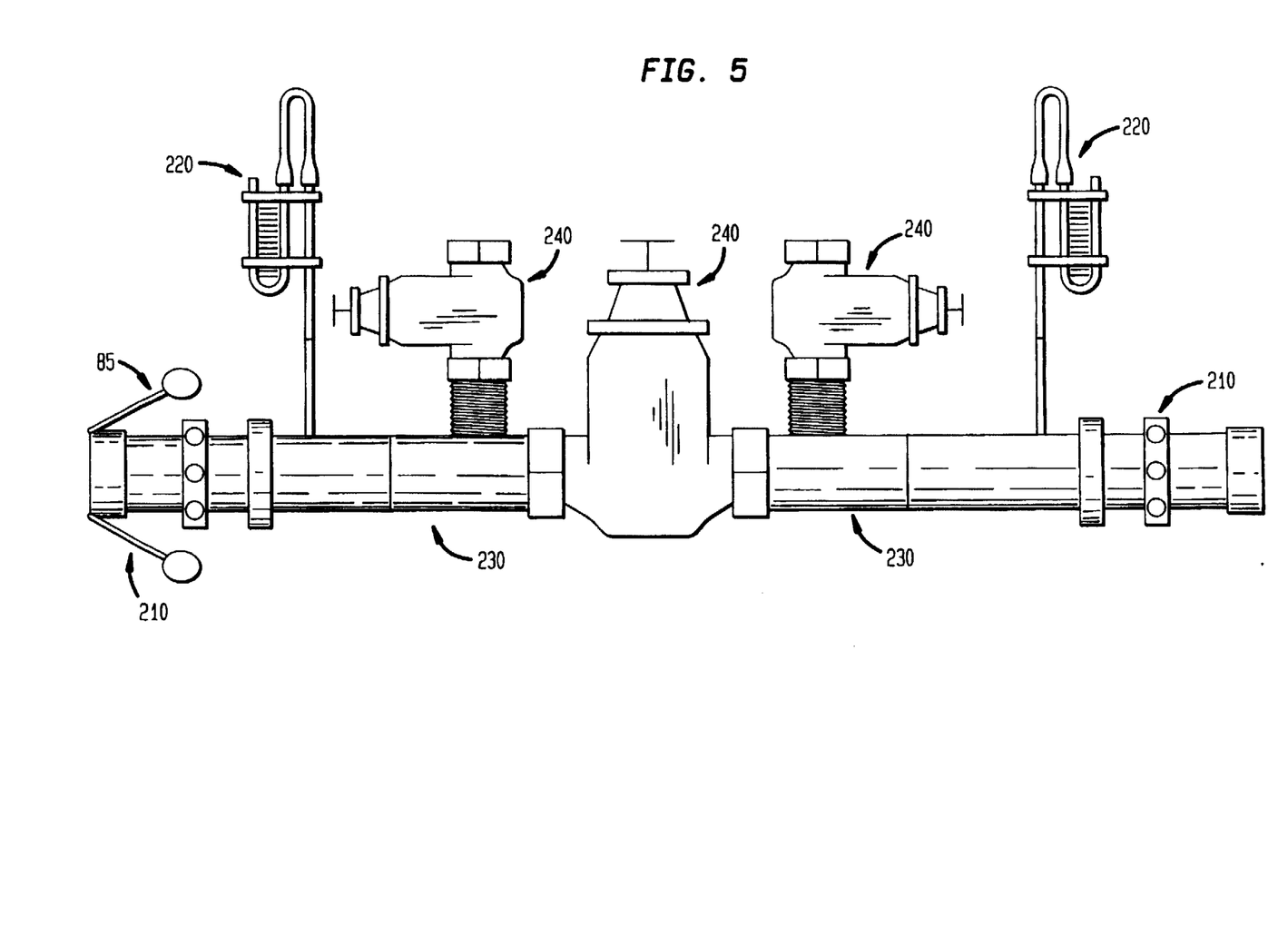
FIG. 5 is a side plan view of an attachable assembly for by-passing, purging, gas up, line pressure, line pressure monitoring and venting.
Figure 6:
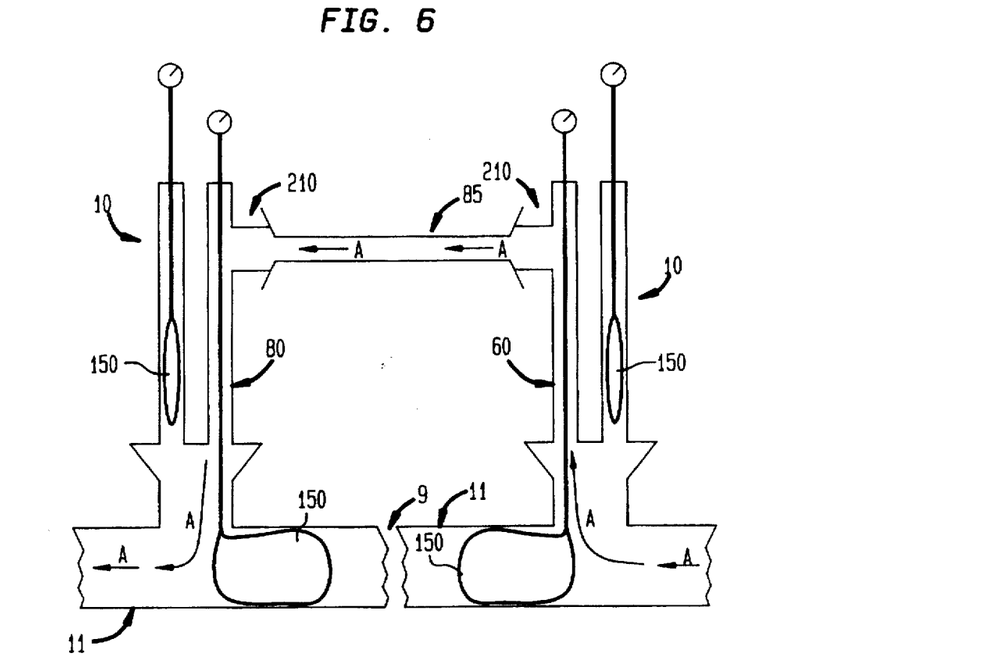
FIG. 6 is a side plan view of two pipeline flow stoppers interconnected by a re-routing pipe to re-route gas flow about a broken pipeline.
Figure 7:
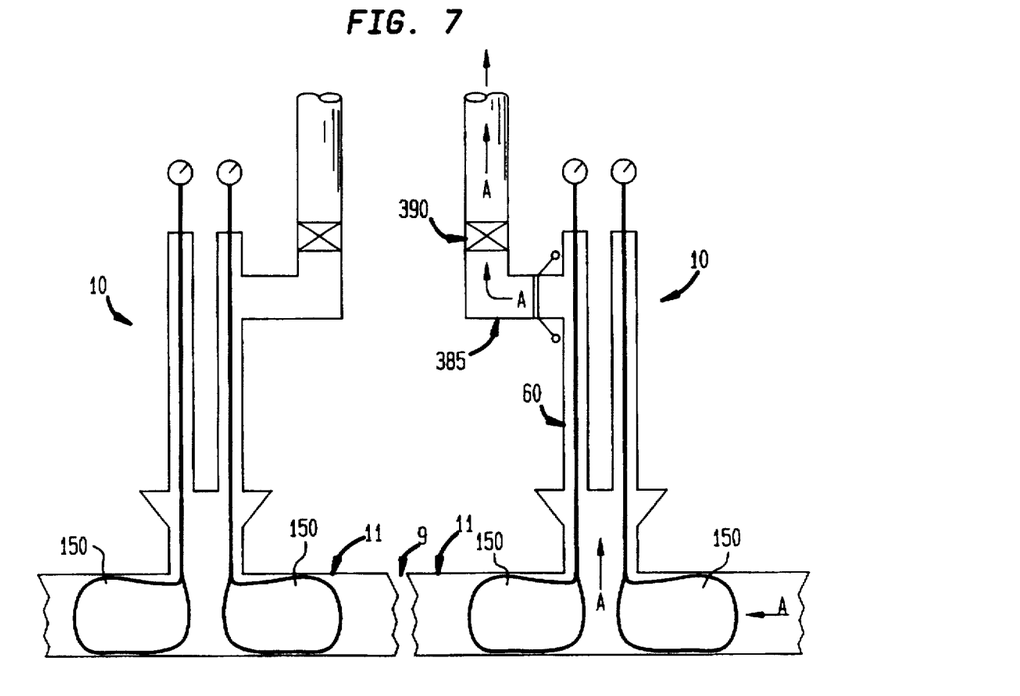
FIG. 7 is side plan view of two pipeline flow stoppers positioned about a break in a pipeline having vents for venting gas that seeps between the dual air bags.

Referring now to FIGS. 5–7, if re-routing gas flow around a broken pipe is desired, one bag can be deflated, and a re-routing pipe 85 can be connected to one of the ports 64 or 84 of one of the shafts 60 or 80 to interconnect an auxiliary flow pipe to the pipeline stopper 10. In this manner, the flow of gas though a pipeline can be re-routed through the gas pipeline stopper 10 and about a broken pipeline. As shown in FIG. 5, such a re-routing pipe 85 would preferably include a quick connect 210 for attachment to a port. Thereafter a pressure gauge 220 could be interconnected with pipe 85 to measure pressure. Thereafter, tee 230 may be interconnected to allow for attachment of one or more ball valves 240. Thereafter another pressure gage 220 may be employed, and another quick connect 210 may be used, to interconnect the re-routing pipe as desired. This allows for the removable assembly for by-passing, purging, gas up, line pressure monitoring and venting.

Referring to FIG. 6, a re-routing of gas flow around a break 9 and a pipeline 11 is illustrated. The re-routing pipeline flow stoppers 10 are attached to the pipeline by means of quick connects 210. Each pipeline stopper has one air bag 150 inflated and one of the air bags 150 is deflated. Accordingly, gas flow, shown by arrows A, goes into one pipeline stopper 10, up one of the individual dual shafts 60, through the re-routing pipe 85, down into one of the individual dual shafts 80 of the other pipeline stopper 10, and through the pipeline flow stopper 10 and back into the pipe 11 as shown by arrows A.

Referring now to FIG. 7, it can be seen that the pipeline flow stoppers 10 of the present invention are positioned about opposites sides of a break 9 in a pipeline 11. The inflatable bags are positioned in the pipeline and inflated to block the flow of gas therethough. However, some gas may seep by the upstream air bag and become trapped between the dual air bags of a gas pipeline stopper 10. Such gas can flow up one of the individual dual shafts 60 to a vent pipe 385 having a valve 390 thereon to vent gas into the atmosphere to relieve pressure build up between the dual air bags.

The cylindrical stopper housing 20 of the inflatable gas pipeline stopper 10 is attachable to a pipe 11 by means of a Mueller machine or any other drilling and tapping machines sold by other manufacturers. Likewise, the present invention can be fully utilized with tee attachments for plastic pipes. Importantly, a hole is tapped into a pipeline 11, an attachment means attached thereto, and a valve means 12 is attached to the attachment means. Thereafter, the stopper of the present invention is attached to the valve means and the air lines and inflatable bags are inserted into the pipeline through the valve.

The air bags may be any air bags known in the art, but are preferably air bags constructed in accordance with the teachings of copending U.S. patent application Ser. No. 08/380,210 filed Jan. 30, 1995, by Petrone, which is a continuation application of U.S. patent application Ser. No. 08/176,043 filed Dec. 30, 1993 by Petrone, abandoned, and U.S. patent application Ser. No. 08/294,372 filed Aug. 23, 1995, by Petrone, now pending. The entire disclosure of these applications are incorporated herein by reference. Such air bags are directional in nature, having a rigid member within the air bag for pointing the air bag in a desired direction, and accordingly, one air bag 150 is positioned to point upstream and the other air bag 150 is positioned to point downstream. The air bags 60 are impervious to fluid flow and when inflated within the pipeline 11 block flow of gas through the pipeline.

The inflatable gas pipeline stopper of this invention inserts two inflatable directional air bag type pipeline stoppers, one upstream and the other downstream, into a steel, cast iron or plastic gas pipeline. Additionally, this invention vents any gas escaping past the upstream air bag into the atmosphere. Further, it is necessary only to drill one hole in the gas pipeline is necessary to accomplish this. Previous to this invention, three separate holes had to be drilled and tapped into the gas pipeline at each side of a broken gas pipe.

The air lines 140 may be rigid air pipes or alternatively could be flexible air lines supported at the upper and lower ends thereof by a rigid frame. In another embodiment, air lines could be replaced by channels within the stopper housing and the air bags could be ejected into the pipeline and retracted therefrom by means of air pressure. Likewise, the stopper housing itself could function as the air line and feed both air bags.

Having thus described the invention in detail, it is to be understood that the foregoing description is not intended to limit the spirit and scope thereof What is desired to be protected by Letters Patent is set forth in the appended claims.

What is claimed is:

1. An apparatus for providing an air tight seal for use in stopping gas flow through a broken gas pipeline to allow for repairs to be made to the pipeline, comprising:

first quick connect means for attachment to a valve attached to a pipeline;

junction means interconnected with the first quick connect means;

first and second shafts attached to the junction means; and first and second lines attached to first and second air bags, the air bags independently or jointly extendable through the first and second shafts, through the junction means, through the first quick connect means, through a valve and into a pipeline, to stop gas flow through a gas pipeline.

2. The apparatus of claim 1 wherein the first and second shafts include upper quick connect means at the upper ends thereof to allow for quick removal of the lines and air bags therefrom.

3. The apparatus of claim 2 wherein the first and second shafts further include valve means for stopping the flow of gas therethrough.

4. The apparatus of claim 3 wherein one of the first and second shafts further include a port for connection of a vent thereto to vent gas that seeps between the air bags when positioned in a gas pipeline.

5. The apparatus of claim 3 wherein one of the first and second shafts further include a port for attachment of a re-routing pipe to re-route the flow of gas about a broken pipeline.

6. The apparatus of claim 5 further including a re-routing pipe having a first quick connect for attachment to the port on one of the first or second shafts.

7. The apparatus of claim 6 further comprises a pressure monitor means interconnected with the re-routing pipe.

8. An apparatus for providing an airtight seal for use in stopping gas flow through a broken gas pipeline to allow for repairs to be made to the pipeline, comprising:

first quick connect means for attachment to a valve attached to a pipeline;

junction means for interconnected with the first quick connect means;

a first shaft interconnected with the junction means;

a second shaft interconnected with the junction means;

upper quick connect means attached to upper ends of the first and second shafts;

first and second lines extending through the upper ends of the first and second shafts; and first and second air bags interconnected with the first and second lines, the first and second air bags independently or jointly extendable through the first and second shafts, through the junction means, through the first quick connect means, through a valve and into a pipeline, to stop gas flow through a gas pipeline.

9. The apparatus of claim 8 wherein the first and second shafts include stuffing boxes at the upper ends thereof to air tight seals for the first and second lines extending therethrough.

10. The apparatus of claim 9 wherein the first and second shafts further include valve means for stopping the flow of gas therethrough.

11. The apparatus of claim 10 wherein at least one of the first and second shafts include a port for connection of a vent thereto to vent gas that seeps between the air bags when positioned in a gas pipeline.

12. The apparatus of claim 10 wherein at least one of the first and second shafts further include a port for attachment of a re-routing pipe to re-route the flow of gas about a broken.

13. The apparatus of claim 12 further including a re-routing pipe having a first quick connect for attachment to the port on one of the first or second shafts.

14. The apparatus of claim 13 further comprising a pressure monitor means interconnected with the re-routing pipe.

15. A method for re-routing gas flow through a first gas pipeline stopper apparatus around a break in a gas pipeline to allow for repairs to be made to the pipeline, comprising the steps of:

attaching a first quick connect means to a valve attached to a pipeline;

attaching a junction box to the first quick connect means;

attaching first and second shafts to the junction box each of said shafts capable of receiving an air line with an air bag;

attaching a re-routing pipe to one of the shafts;

inserting an air line with an air bag through each of the shafts, and through the junction means, the first quick connect means and a valve and into a pipeline;

inflating at least one of the air bags positioned within the pipeline and attached to the respective air line;

retracting at least one of the air bags to a position within one of the shafts out of the flow of gas; and connecting a second gas pipeline stopper apparatus, located on the other side of a break in a pipelines to the re-routing pipe for receiving re-routed gas flow from the first gas pipeline stopper apparatus.

16. The method of claim 15 further comprising the step of attaching a pressure monitor means to the re-routing pipe to measure pressure.

* * * * *